Aug. 5, 1958     C. GROSSI     2,845,745
ANIMAL TRAP Filed Aug. 10, 1953     11 Sheets-Sheet 1

INVENTOR.
CARLO GROSSI
BY
Frank H. Harmon
ATTY.

Aug. 5, 1958

C. GROSSI 2,845,745

ANIMAL TRAP

Filed Aug. 10, 1953

INVENTOR.
CARLO GROSSI
BY
Frank A. Harmon
ATTY.

Aug. 5, 1958  C. GROSSI  2,845,745
ANIMAL TRAP
Filed Aug. 10, 1953  11 Sheets-Sheet 3

INVENTOR.
CARLO GROSSI
BY
ATTY.

Aug. 5, 1958  C. GROSSI  2,845,745
ANIMAL TRAP
Filed Aug. 10, 1953  11 Sheets-Sheet 5

INVENTOR.
CARLO GROSSI
BY
ATTY.

FIG. 14

INVENTOR.
CARLO GROSSI
BY
Frank A. Harmon
ATTY.

Aug. 5, 1958     C. GROSSI     2,845,745
ANIMAL TRAP

Filed Aug. 10, 1953     11 Sheets-Sheet 7

INVENTOR.
CARLO GROSSI

Aug. 5, 1958 C. GROSSI 2,845,745
ANIMAL TRAP
Filed Aug. 10, 1953 11 Sheets-Sheet 8

INVENTOR.
CARLO GROSSI
BY
Frank H. Harmon
ATTY.

Aug. 5, 1958    C. GROSSI    2,845,745
ANIMAL TRAP
Filed Aug. 10, 1953    11 Sheets-Sheet 9

*INVENTOR.*
CARLO GROSSI
BY
*Frank H. Harmon*
ATTY.

Aug. 5, 1958

C. GROSSI 2,845,745

ANIMAL TRAP

Filed Aug. 10, 1953

INVENTOR.
CARLO GROSSI
BY
ATTY.

United States Patent Office 2,845,745
Patented Aug. 5, 1958

2,845,745

ANIMAL TRAP

Carlo Grossi, Cleveland, Ohio

Application August 10, 1953, Serial No. 373,238

8 Claims. (Cl. 43—76)

This invention relates in general to animal traps and more particularly to improvements in traps of the same general character as disclosed in my U. S. Letters Patent in th name of Carlo Grossi, for Animal Trap, No. 2,484,-452, Oct. 11, 1949, and No. 2,549,080, April 17, 1951.

In both of these patents, provision was made for entrance of the animal into the trap, the closure door for the opening being normally held in open position by a platform tiltable about a transverse axis, which platform when tilted in the appropriate direction by the weight of the animal, resulting in closing the door and in providing an escape for the animal, only by means of an upright ladder passageway, the outlet of which is arranged in operative relation to a dumping platform tiltable about a longitudinal axis, which serves, by the weight of the animal thereon, to deliver the animal into a removable receptacle containing liquid in which it is drowned, and in which mechanism provision is made for the resetting of the entire mechanism and the opening of the entrance, upon entrapment of one animal for a succeeding animal to be entrapped.

I have found, however, by means of actual experience, that in duplex types of animal traps of the types disclosed in the aforesaid patents, that it is of distinct advantage to provide the animal with a clear, unobstructed view, of not only the bait tray, but also the exterior beyond the other side of the trap. I have also found it highly desirable in such duplex types of traps to have only one entrance in each unit in order to prevent the animal from escaping the trap without getting involved with the door closure in the trapping mechanism. I have also found, as the result of actual experience, that with respect to the dumping platform for dumping the entrapped animal into the liquid tank after he has climbed the ladder, that if the dumping platform has a tendency to tilt into dumping position immediately upon the animal reaching the platform, there is a marked tendency upon the animal to retreat quickly enough from the dumping platform to avoid being dumped into the drowning tank.

I have also found, as the result of actual experience, that with respect to the closure door for the entrance into the trap, instances where, especially those animals having long tails, such as mice, rats and the like, enter the trap, the closure door for the opening, which is intended to prevent escape of the animal from the trap, merely drops lightly upon the tail, and gives the opportunity for the animal, which opportunity is usually grasped by the animal, to quickly, with its paws, lift the closure door upwardly sufficiently to enable the animal to escape from the trap through the opening through which it entered the trap.

Among the objects of my invention, therefore, is the provision of a duplex animal trap that is so designed as to have only one entrance in each of the two units of the duplex trap and so arranged as to provide for a clear view all of the way through the trap, as well as a clear view of the bait tray.

Another highly important and primary object of my invention is the provision of automatic means actuated by the animal upon entrance into the trap for closing the closure door behind the animal, and particularly for locking the door against efforts by the animal to raise the same in the event that the door has closed on part of its body or tail, the locking means being effective in any of a great number of positions of door closing until the door has become fully closed with the animal completely within the trap, whereupon the special locking means for the door in no way interferes with the normal operation of the mechanism for entraping and resetting of the trap for a subsequent catch.

Another highly important and primary object of the invention is the provision of an improved tiltable dumping platform for each of the two independent units of the duplex trap, in which a solid and stable platform is provided for the animal, once he has climbed the ladder and is hunting for an escape, the purpose of the provision of such a stable platform being to prevent any tendency upon the animal to retreat, and the provision of locking and releasing mechanism for the dumping platform so designed that the dumping platform will remain solid and stable until after a considerable travel of the animal on the dumping platform, and near the end of the passage, before sudden tilt of the platform occurs so as to insure dumping of the animal before it can successfully change its mind for escape from the dumping platform back into the trap.

Another object of the invention is to provide such an animal trap that is so designed as to be inexpensive in cost, easily assembled and disassembled, and its various units and parts easily removed for inspection, and replacement and in which in assembling and servicing the bait tray and water drowning tank it is unnecessary to actually handle any surface that has been contacted by an animal that has been trapped.

With the foregoing and other objects in view, the invention resides in the combination of parts and in the details of construction hereinafter set forth in the following specification and appended claims, certain embodiments thereof being illustrated in the accompanying drawings in which:

Referring more particularly to the drawings, I have shown one form which my trap may take, and in which in Figures 1, 2, 27, 28 and 29, I have shown generally the readily assembled and removable units to comprise a base 1, a main trapping and resetting unit 2, with its built-in vertical ladder 3, the ladder housing 4, the bait tray 5, the water tank 6 and its locking handle 7.

Figures 1, 2:
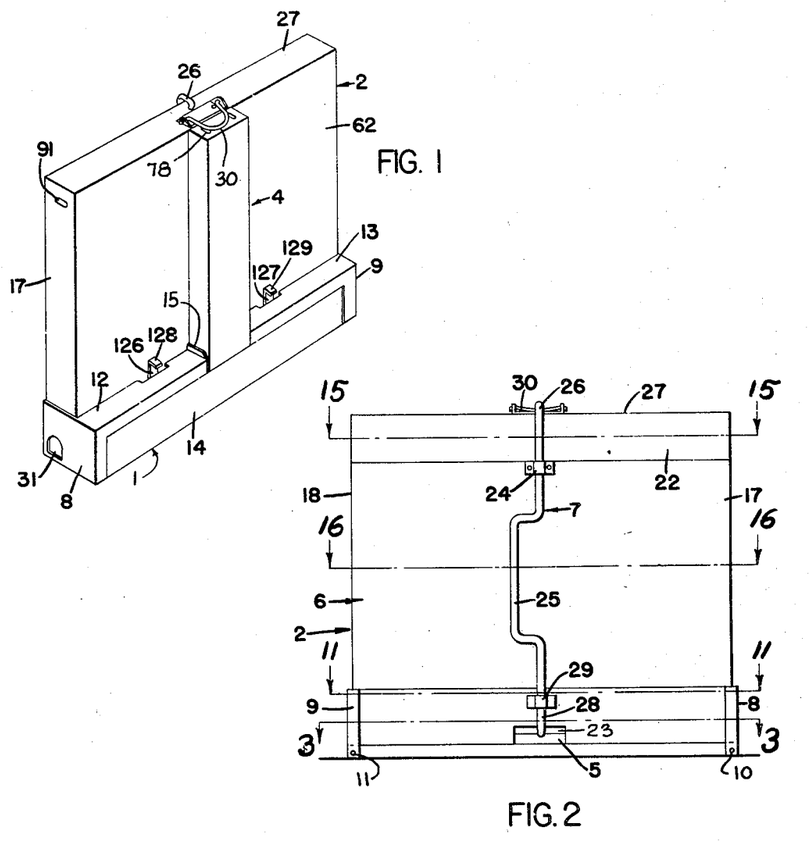
Figure 1 is a view in front elevational perspective of the assembled trap, showing one form my invention may take.
Figure 2 is a view in rear elevation of the same.
Figure 29:
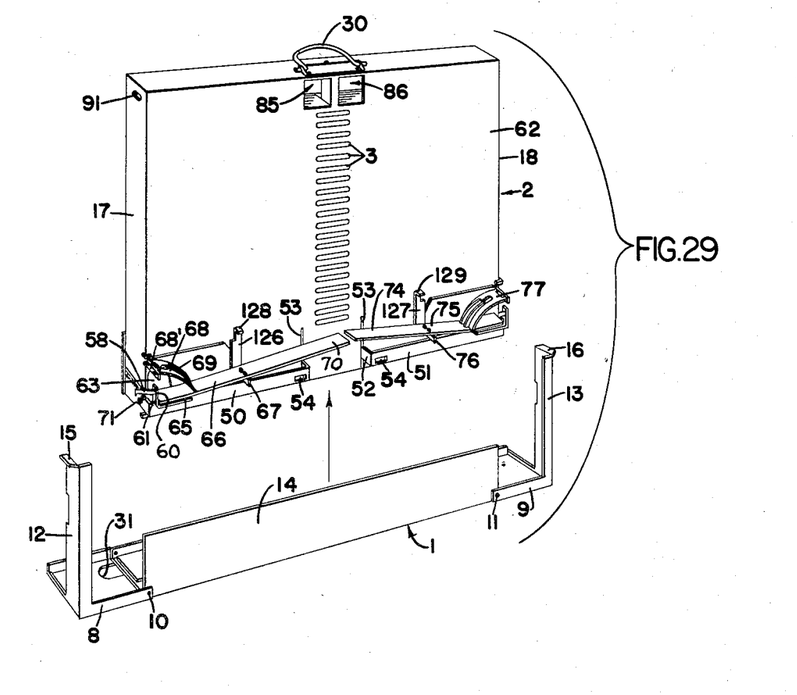
Figure 29 is an exploded view in perspective with the main body portion of the trap removed from the base.

For purposes of ease of assembly and disassembly, the base 1 has its two end walls 8 and 9 pivotally connected at 10 and 11 to the base. This is to enable them to be swung into the open position of Figure 29 for removal of and insertion of the unit 2. After unit 2 has been placed upon the base, the two end walls are swung to bring their two respective arms 12 and 13 toward the center with their adjacent ends spaced apart. This, with the aid of the forward wall 14 of the base, houses those working parts of unit 2 that are shown in Figure 29. The adjacent ends of arms 12 and 13 have upturned lugs 15 and 16 to be engaged by the bottom side edges of unit 4 which houses the vertical ladder 3, as shown in Figure 1.

Figure 16:
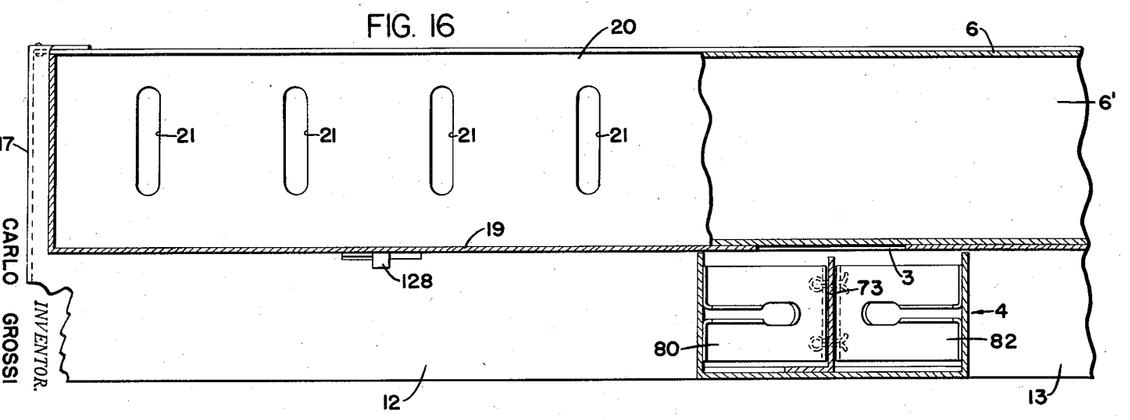
Figure 16 is a view in section taken along line 16—16 of Figures 2, 10 and 14.
Figure 17:
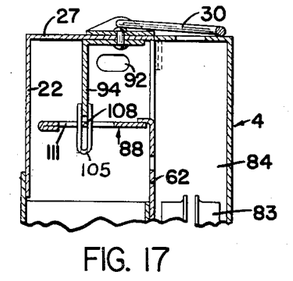
Figure 17 is a view in section taken along line 17—17 of Figures 14 and 15, showing the locking mechanism for the dumping platform.
Figure 18:
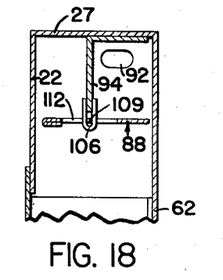
Figure 18 is a view in section taken along line 18—18 of Figures 14 and 15, showing the middle hinge of one of the dumping platforms.

The rear side of unit 2 has an open bottom and end walls 17 and 18 and a low height rear wall 19 with a joining top wall 20 having a series of apertures 21 therein, as shown in Figure 16. Near its upper edge, unit 2 has a short rear wall 22, whose lower open bottom edge is spaced appreciably from the upper edge of rear wall 19. This leaves an open space sufficient to receive the tank 6 that contains liquid for drowning the entrapped animal. Rear wall 19 also has an aperture 23, to mate with a similar aperture in the rear wall of the base, to removably, and slidably, receive the tray 5 for containing the animal bait. As shown in Figure 2, the tank 6 is provided with a bracket 24 to rotatably receive the locking handle 7 that is provided, midway of its vertical ends, with a gripping handle loop 25. Its upper end has a hook 26 to engage a hole in the upper wall 27 of unit 2, and a lower end 28 that extends through a bracket 29 and behind the rear wall of bait tray 5, as shown in Figure 2, to assemble the tank and bait tray in position in the assembly. Handle 30, connected to the top wall 27 of unit 2, permits carrying of the whole trap.

As stated before, my trap is a duplex unit, in which entrances are provided at both ends of the trap, which is of general rectangular shape. As will be further explained in greater detail, the arrangement is such that an animal, as it approaches one entrance into the trap, has a clear vision of the bait in the tray as well as a clear vision throughout the length of the trap and through the opposite opening of the other entrance of the other half of the duplex trap. Moreover, by means also to be described in further detail, identical means are provided in each half of the trap, whereby when the animal enters one of the entrances in the trap, a closure door closes behind him and another door simultaneously closes access to the bait tray, leaving him, as an only escape, a passage provided with means that not only prevents his retreat out of the trap, but also resets the trap for another catch. In addition, means are provided for leaving as an only avenue of escape, a vertical ladder which is divided into two vertical components by a ladder housing so that the animal climbs the ladder and is diverted to a longitudinally pivoted dumping platform, which also comprises two parts, one for each of the trapping units of the trap. The only part of the assembly that is common to both units of the trap asembly is the liquid containing tank for drowning the animals that are entrapped and dumped thereinto by the dumping platforms.

Figure 7:
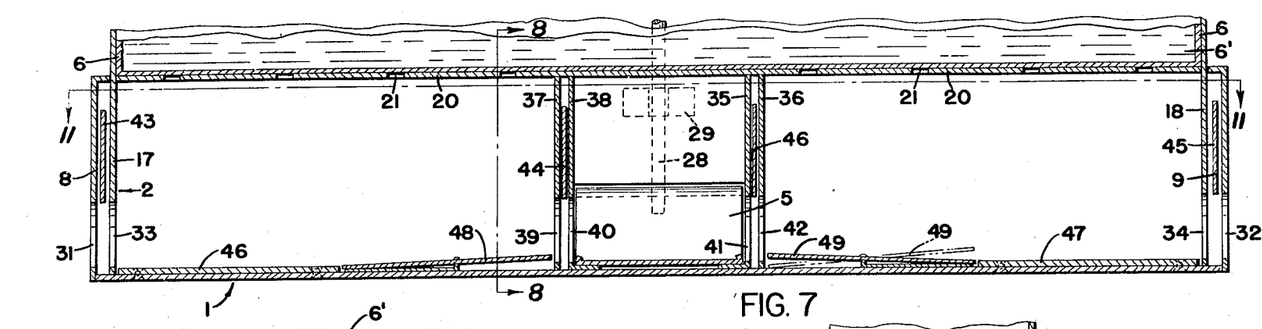
Figure 7 is a view in section taken along line 7—7 of Figures 3 and 11, showing the closure doors and the operating and locking mechanism.

The two end walls 8 and 9 of the base are respectively provided with animal entrance holes 31 and 32. These holes are designed to provide for an accessible, but fairly snug, fit for the body of the animal desired to be trapped. The two end walls of unit 2 are also provided with animal entrance holes 33 and 34, which are of the same size and shape as holes 31 and 32 in the end walls 8 and 9 of the base, and are also in alignment with one another when the trap is assembled, as shown in Figures 1 and 29. The unit 2 is also provided, near its longitudinal center, with spaced vertical walls 35 and 36 and also with spaced vertical walls 37 and 38 on the two sides of the bait tray compartment. Walls 37 and 38 have apertures 39 and 40 and walls 35 and 36 have apertures 41 and 42, all four of which apertures are of a size comparable to apertures 31 to 34, inclusive, and in alignment therewith, as shown in Figure 7. By means yet to be described, and by reference to Figure 7, there are provided closure doors 43 and 44 that are operated into position simultaneously to open and close apertures 31 and 33 and apertures 39 and 40. It will be seen that closure door 43 is positioned to operate into open and closed positions between the end wall 8 of the base and end wall 17 of unit 2, and closure door 44 is positioned to operate into open and closed positions between the internal vertical walls 37 and 38 of unit 2. Likewise, a closure door 45 is positioned between end wall 9 of the base and end wall 18 of unit 2, and closure door 46 is positioned between vertical walls 35 and 36 of unit 2 so that, with respect to this unit of the duplex type, closure doors 45 and 46 are operated simultaneously in this position to close and open apertures 32, 34, 41 and 42, independently of the operation of closure door 43 and 44. The purpose of having closure doors, such as doors 43 and 44, operate simultaneously, is to close the door 43 behind the animal and to close door 44 to prevent it from reaching the bait tray and to close both of these avenues of escape.

Figure 8:
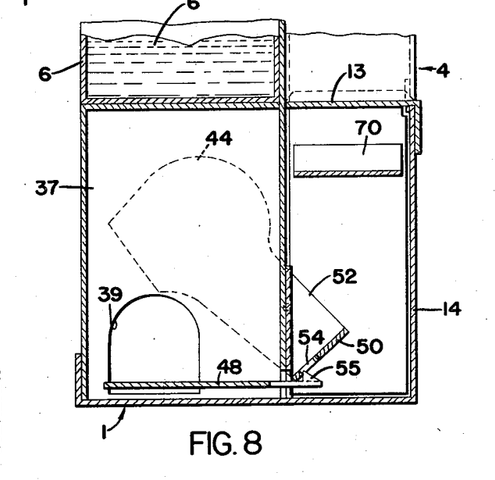
Figure 8 is a view in section taken along line 8—8 of Figures 3, 7 and 10, showing the bait tray door open.
Figure 11:
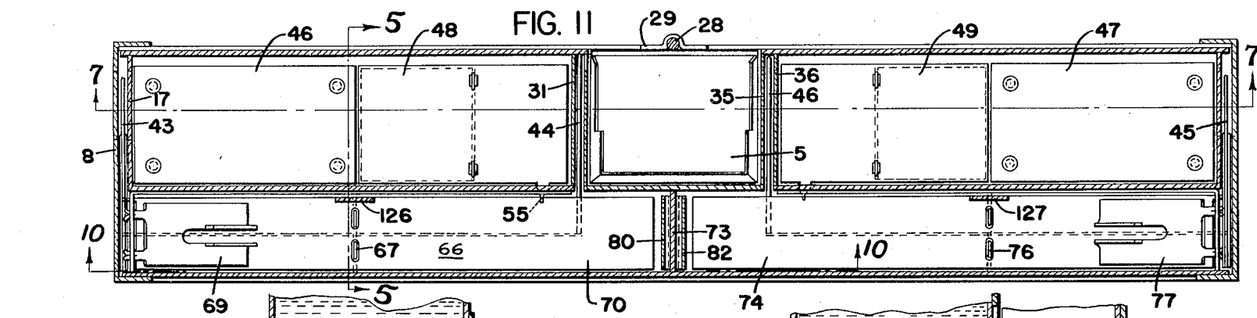
Figure 11 is a view in section taken along line 11—11 of Figures 2, 7 and 10, showing the closure door locking and operating mechanism.
Figure 12:
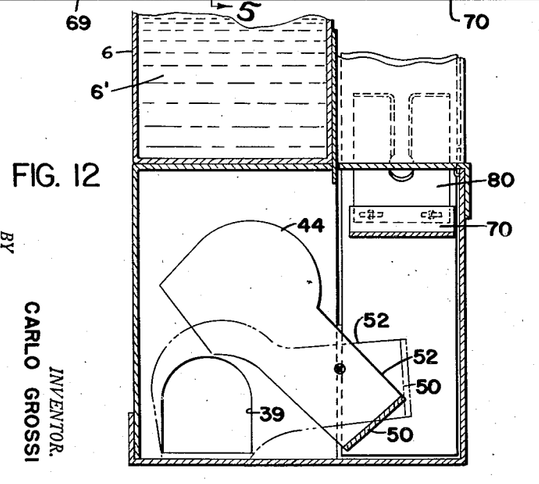
Figure 12 is a view in section taken along line 12—12 of Figures 3 and 10, showing both bait tray opening doors, with one open and one closed.
Figure 13:
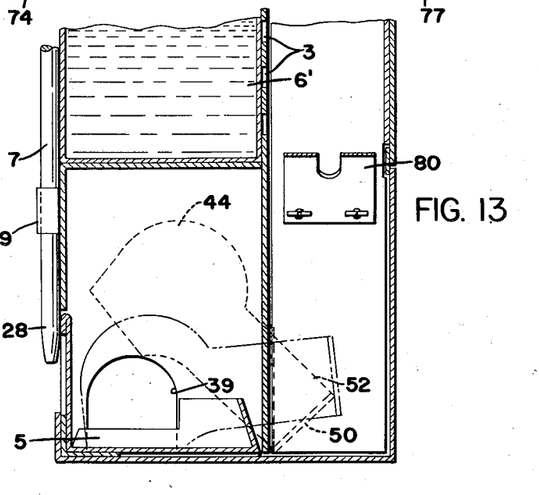
Figure 13 is a view in section taken along line 13—13 of Figure 10, showing the one bait tray opening door in both open and closed positions.

In order to accomplish this objective, I provide stationary floors 46 and 47 on the bottom of the base 1 as seen in Figs. 7 and 11. Coextensive with these floorings 46 and 47, and of approximately the same height, I provide plates 48 and 49 respectively so as to be transversely pivotally connected to the base, as shown in Figure 8.

Figure 3:
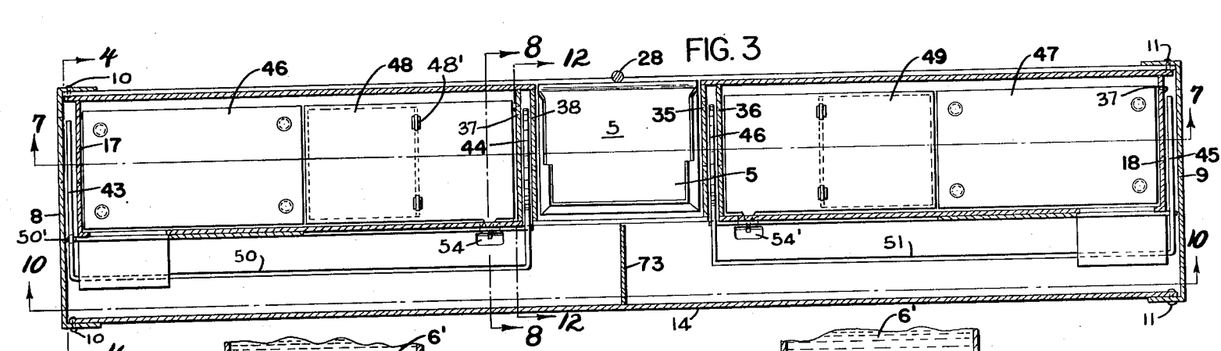
Figure 3 is a view in enlarged section taken along line 3—3 of Figure 2, showing the closure doors for the entrance and bait tray.
Figure 4:
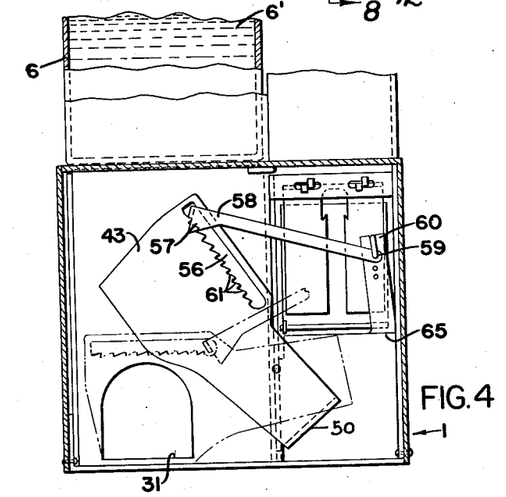
Figure 4 is a view in section taken along line 4—4 of Figures 3 and 10, showing the pawl and ratchet locking device to lock the automatic closure door to the trap entrance.
Figure 5:
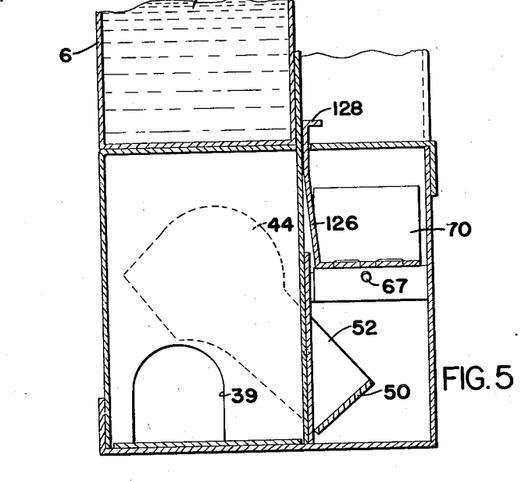
Figure 5 is a view in section taken along line 5—5 of Figures 10 and 11, showing the bait tray opening and closure door.
Figure 9:
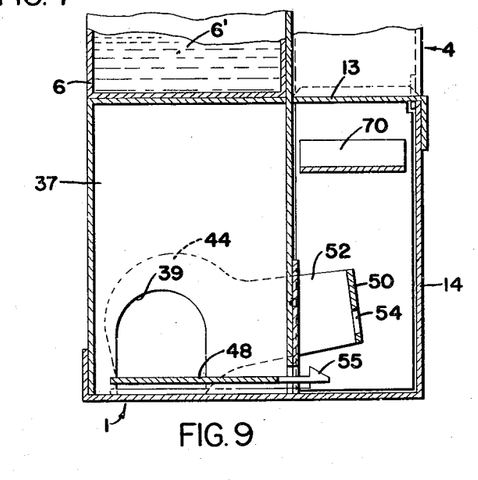
Figure 9 is a view similar to Figure 8, showing the door in position to close the bait tray opening.

As shown in Figures 3, 4 and 5, closure doors 43 and 44 form an integral part of a bar 50 so as to be rotatable about its own longitudinal axis defined by pins 50' carried by end wall 17 and vertical wall 37 of unit 2. Likewise, for the other unit of the duplex trap, closure doors 45 and 46 form an integral part of a bar 51 that is mounted to be rotatable about its own longitudinal axis defined by pins carried by end wall 18 and internal vertical wall 36 of unit 2. These two bars 50 and 51 have arms 52 that extend inwardly through slots 53 internally of unit 2. Near their inner ends, bars 50 and 51 are provided with apertures 54 and 54', respectively, the purpose of which becomes more apparent by reference to Figures 7, 8 and 9. In Figure 8, the tank 6 is shown to contain liquid 6'. The closure door 44 that is positioned between the internal walls 37 and 38 of unit 2, is shown in raised position for open access through apertures 39 and 40 to the bait tray. Inasmuch as in this view the aperture 40 is directly behind aperture 39, the aperture in Figure 8 is designated at 39, it being understood that closure door 44, in closing aperture 39, simultaneously closes aperture 40. It is also to be understood that inasmuch as closure door 44 is an integral part of bar 50, there is also an integral part of closure door 43 for opening and closing the aligned holes 31 and 33 in the base 1 and unit 2. Therefore, the mechanism for closing doors 43 and 44, about to be described in connection with Figures 7, 8 and 9, is identical. As the animal enters through aligned apertures 31 and 33 and proceeds along the solid platform 46, in quest of food in the bait tray, it then engages the transversely pivoted platform 48 which is normally counterbalanced to be inclined counterclockwise, as viewed in Figure 7, when the weight of the animal is impressed upon the part of the platform beyond the pivot point toward the bait tray, closure doors 43 and 44 are released from normally upper locked position to fall by gravity into their respective lower positions to simultaneously close apertures 31, 33, 39 and 40. The means for accomplishing this is the provision of a locking hook 55 arranged on the outer edge of the treadle 48 near the forward portion thereof past the pivot point and adjacent the aperture 39. In Figure 8, the locking hook 55 of treadle 48 is shown to be engaging an aperture 54 in the bar 50 that is common to, and integral with, closure doors 43 and 44. Therefore, as long as this locking engagement continues, the closure doors 43 and 44 remain locked in their upper positions to leave apertures 31, 33, 39 and 40 open. When, however, the weight of the animal is impressed upon the forward, or inner, portion of treadle 48, the latter is swung about its transverse pivot 48', Fig. 3, to release hook 55 from the aperture 54 in the bar 50. This permits the bar and its two closure doors 43 and 44 to fall by gravity into the position shown in Figure 9, as the bar rotates counterclockwise about its longitudinal axis to close apertures 31, 33, 39 and 40 simultaneously.

With the operating parts of the trap assembly in this position shown in Figure 9, the animal would normally be in a position of having no avenue of escape, inasmuch as door 43 is closed behind it and door 44 is closed ahead of it. I have found, however, by means of actual experience, that there are instances where animals, especially those of the rodent type with long tails, have entered the trap sufficiently to bring about the closure of doors 43 and 44, the closure door 43, in falling by gravity, comes the position of resting lightly upon the animal's tail, there is afforded the opportunity, which is commonly instinctively taken advantage of by the animal of raising the closure door 43 by means of its front paws, or its nose or tail, in order to bring about its escape through the apertures 31 and 33 through which he has just entered. As stated before, it is one of the primary objects of my invention to prevent this possibility. Bearing this in mind, it must also be appreciated that I do not want to amputate the tail or trap the animal in this position by binding the tail, and consequently the animal, in this position, as it would render the trap inoperative for further subsequent catches. On the contrary, I merely want to provide a means that will permit the closure doors to fall by gravity lightly into closing position, but prevent the animal from raising the door from any position of closing to which the door has fallen by gravity.

In order to accomplish this objective, I have provided means, best shown in Figures 4 and 29, to include a longitudinal slot 56 in the upper portion of closure door 43 to receive a pawl 57 which is the forward portion of an arm 58 that has its other end pivotally connected at 59 to a bracket 60 from a part of the stationary housing of unit 2. The inner surface of door 43 within the slot 56 is provided with a series of saw teeth 61 to provide a ratchet for downward sliding engagement of pawl 57 and to prevent upward movement of closure door 43 by upward pressure on its lower edge. It is to be understood, that an identical arrangement is provided for closure door 45 at the other entrance of the other unit of the duplex trap. Thus, when the door 43 has lightly fallen upon the animal, or its tail, any efforts on its behalf of raising the closure door 43 is to no avail, its tail not being bound, the animal will instinctively withdraw its tail so as to bring about complete closure of the door 43 behind it and the door 44 ahead of it.

Figure 10:
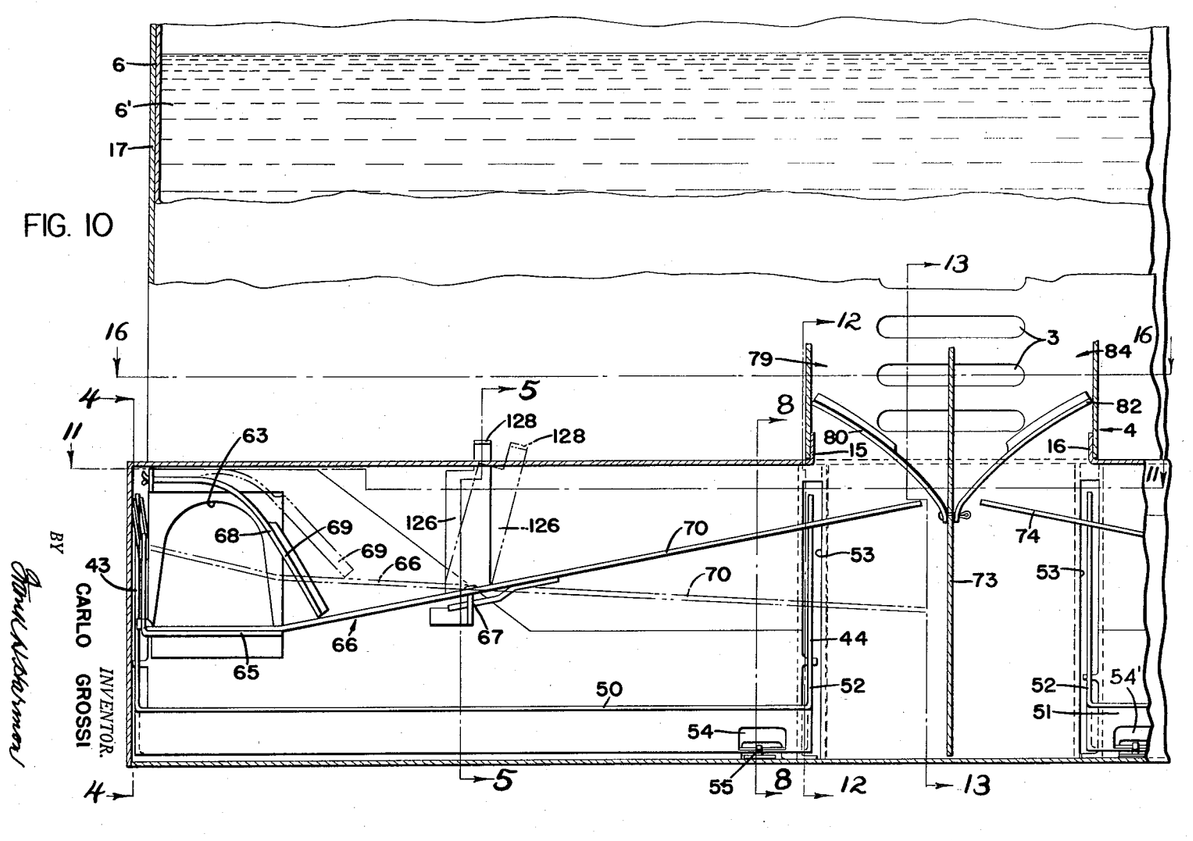
Figure 10 is a view in section taken along line 10—10 of Figures 3 and 11, showing the resetting mechanism for opening the closure doors.
Figure 14:
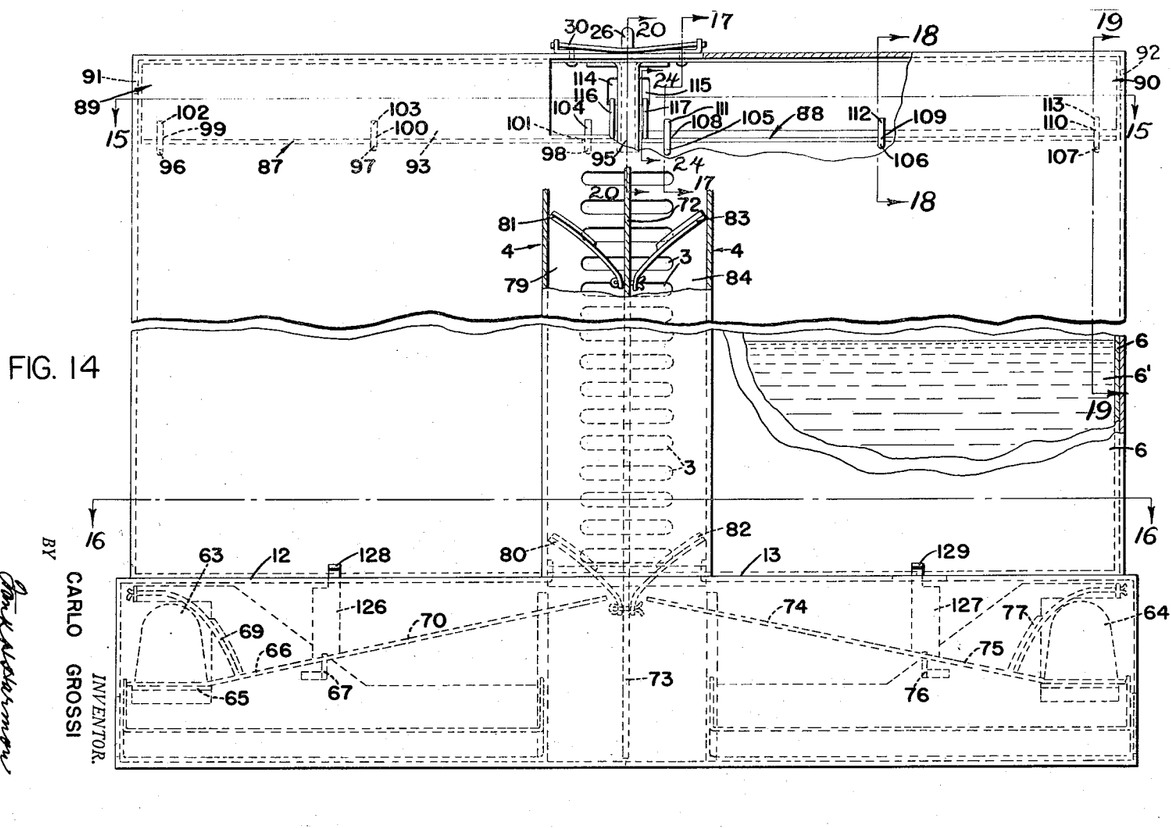
Figure 14 is a view in front elevation of the trap, partly broken away to show the stairway, the water tank and a portion of the dumping platform, the two animal entrances and resetting walking beams and the remainder of the stairway and dumping platform being shown in dotted lines.

The front wall 62 of the unit 2 is provided with apertures 63 and 64 near its two end walls 17 and 18 of the two trapping units of the duplex trap, as shown in Figures 10, 14 and 29. These apertures are at right angles to the entrance openings 31 and 32 and are continuously open with no closure doors provided therefor. It is through these openings 63 and 64 that the animal proceeds after having been trapped respectively by closure doors 43 and 45 being closed behind it and doors 44 and 46 having been closed ahead of it, adjacent the bait tray.

Integral with bracket 60 is a platform 65 for supporting one end of the runway 66 that is pivotally connected to a lug 67 on the front wall of the unit 2 to provide a transverse pivot for the runway 66, as shown in Figures 10, 14 and 29. The runway 66 is counterbalanced to normally assume the position shown in Figure 29 with its left end resting on platform 65. Upon emerging through an opening, such as opening 63, the animal in stepping on the left end of runway 66 finds it to be a stable platform and not a movable one which would otherwise make it inclined to retreat. As the animal proceeds forwardly, it pushes past a pivoted lever 68, which is transversely pivotally connected at 68' to the front wall 62 of the unit 2. This lever is gravity actuated to assume the downward position of Figure 29. This lever 68 is also preferably slotted centrally to present sharp edges 69 which deter the animal from any effort of raising lever 68 to retreat. Having no means of retreat, the animal then proceeds forwardly on the runway 66 past the transverse pivot point 67 to the forward part 70 of the runway, which is preferably curved, or inclined, upwardly from the plane of the rear straight portion of the runway 66.

The resulting effect of the concentration of the animal's weight on the portion 70 of the runway 66 is to reset the trap by actuating the bar 50 to open closure doors 43 and 44 into open position, as shown in Figure 7, to be locked in such upper open position by means of engagement of hook 55 on treadle 48 with slot 54 of bar 50, as shown in Figures 7, 8 and 9. This is brought about by the provision of a lug 71 extending from the outer end of runway 66 upon which lug 71 the pawl 53 for the closure door 43 rests, as shown in Figures 4 and 29.

The ladder housing 4 is divided vertically into two compartments by a dividing wall 72. For the purposes of assembly, the housing 4 is provided with a lower vertical extension plate 73 that extends between the adjacent inner ends of the inclined section 70 of runway 66 and the inclined section 74 of runway 75 that is transversely pivoted at 76 and above which is arranged a lever 77 that is similar in nature to lever 68, as shown in Figures 27, 28 and 29.

Having reference now to the left hand unit on the trap as it appears in Figure 29, when the animal is standing on the forward, or inner portion 70 of runway 66, it is able to see exterior light coming through a hole 78 in the upper wall of the left compartment 79 of the ladder housing. This is the first view of light by the animal after the closure doors have been closed. Its first inclination is to climb the ladder in pursuance of a possible escape outlet for which it mistakes the small opening 78, which, of course, is far too small to permit egress of the animal. In order to prevent the animal from changing its mind during its progress up the ladder, I have provided two additional safeguards pivotally connected to partition wall 72, these being shown at 80 and 81 in the left compartment 79 and at 82 and 83 in the right compartment 84 of the ladder housing, as shown in Figure 14. These are of light metal so that the animal has no difficulty in pushing them into an open position while climbing the ladder 3, after which they close by gravity behind the animal to make retreat impossible.

The next stage includes the provision of openings in the front wall of unit 2 above the ladder 3 to be coextensive with compartments 79 and 84, respectively, of the ladder housing to accommodate animals trapped in the respective units of the duplex trap. Such openings are indicated in general at 85 and 86 in Figures 27, 28 and 29.

Figure 27:
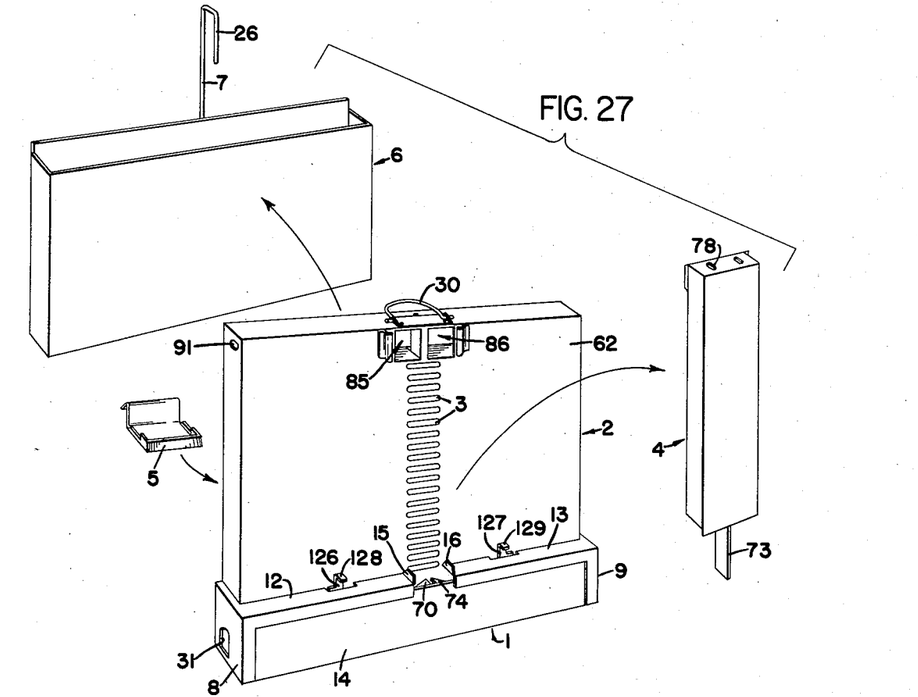
Figure 27 is an exploded view in perspective showing the trap with the food tray, water tank and ladder removed.
Figure 28:
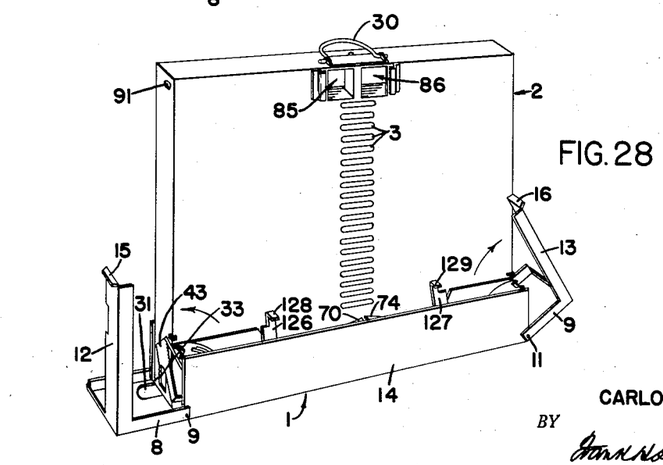
Figure 28 is a view in perspective, showing the trap with the water tank and ladder removed and the base partially disassembled.

The purpose of these two holes 85 and 86 is to respectively provide passages for the animal from ladder housing compartments 79 and 84 to longitudinally pivoted dumping platforms 87 and 88, yet to be described in further detail, and from which the animals are dumped into the common drowning liquid containing tank 6, as shown in Figures 27, 28 and 29.

As the result of actual experience, I have discovered that caution must be taken to provide a stable platform for the animal as he emerges through holes 86 and 85 to avoid any tendency of the animal to retreat after having placed the forward feet on the platform, which would occur if it were shaky, or designed to tilt immediately upon any weight being placed thereupon. Apertures 91 and 92 in end walls 17 and 18 of unit 2 provide for ingress of light from the exterior as a lure for the animal to proceed toward the same on the respective tiltable dumping platforms to be dumped into the tank.

In fulfilling one of the primary objects in providing such a safeguard for positively insuring the dumping and drowning of the trapped animal, I provide means whereby each dumping platform is a normally solid and stable runway for the animal as it steps on it. Moreover, it remains immobile, by new and novel locking and releasing means yet to be described, until the animal arrives just short of the end of the runway in the compartment, whereupon, the platform suddenly tilts both transversely and partially lengthwise after the animal has travelled a sufficient distance to make its retreat back into the cage impossible once the dumping tilting action is initiated.

In between front wall 62 and rear wall 22, and midway of the depth therebetween and extending downwardly from upper wall 27 of unit 2, are a pair of longitudinally extending walls 93 and 94, one for each trapping unit, on each side of the midway partition 95, to form, with the tiltable platforms 87 and 88, and upper wall 27 and front wall 62, of unit 2, two respective longitudinal compartments with the light holes 91 and 92 at the outer ends thereof, as shown in Figure 14.

Figure 15:
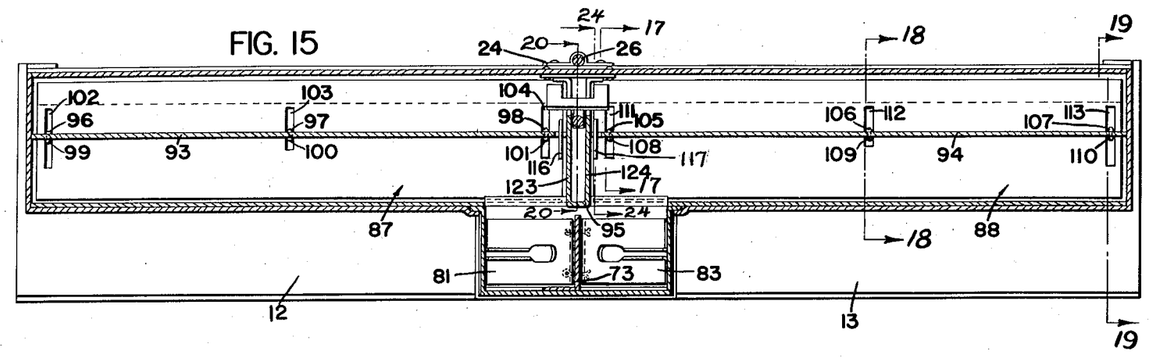
Figure 15 is a view in section taken along line 15—15 of Figures 2 and 14, showing the two dumping platforms.
Figure 19:
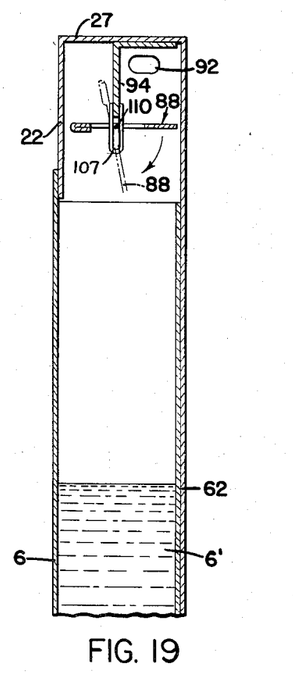
Figure 19 is a view in section taken along line 19—19 of Figures 14 and 15, showing the outersmost hinge of one of the dumping platforms and showing in dotted lines the dumping platform tilted for dropping the animal into the water tank, shown therebelow.
Figure 24:
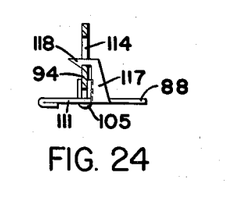
Figure 24 is a view in section taken along line 24—24 of Figures 14 and 15, showing the mechanism for locking the dumping platform in locked position.
Figure 25:
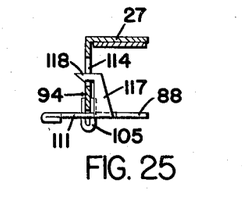
Figure 25 is a view in section of the same taken along line 25—25 of Figure 21.
Figure 26:
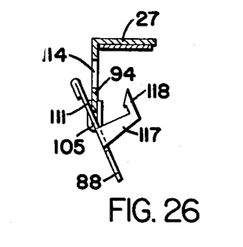
Figure 26 is a view in section taken along line 26—26 of Figure 22, showing a locking lever for the dumping platform in unlocked position.

To the bottom edge of wall 93, I secure three longitudinally spaced loops 96, 97 and 98 to loosely encircle transverse strips 99, 100 and 101, of platform 93, formed by transverse slots 102, 103 and 104 cut on both sides of the transverse strips, as shown in Figures 11, 14 and 15. Similarly, to the bottom edge of wall 94, I secure three longitudinally spaced loops 105, 106 and 107 to loosely encircle transverse strips 108, 109 and 110 of platform 94, formed by transverse slots 111, 112 and 113 cut on both sides of the transverse strips. Slots 102 and 104 and loops 96 and 98 are relatively longer than the midway slot and loop 103 and 97. Likewise, slots 111 and 113 and loops 105 and 107 are relatively longer than the midway slot and loop 112 and 106. In addition, I form in vertical walls 93 and 94, near their inboard ends adjacent partition 95, slots 114 and 115 to be normally engaged by locking hooks on arms 116 and 117 carried by the inboard ends of platforms 87 and 88. Such a hook is shown in greater detail at 118, as a hook for arm 117 on platform 88, in Figures 24, 25 and 26, for engaging slot 114 in wall 94 to normally maintain the tiltable platform 88 in upper horizontal position to form a runway for the animal in a direction toward the light opening 92. This hook locking action maintains in normal position as long as the platform is not subjected to the weight of the animal. It also maintains until the weight of the animal is imposed upon the runway past the midway loop connection 106 and near the outboard loop connection 107, adjacent the light opening 92. This is made possible by the fact that loops 105 and 107 and slots 111 and 113 are relatively longer than the midway loop 106 and slot 112. As long as the animal on platform 88 remains inboard of midway loop 106, its weight is borne jointly by loop connections 105 and 106 in slots 111 and 112, as well as the hook 118 of arm 117 in its locked engagement in slot 114 in wall 94. Inasmuch as the midway loop connection 106 is shorter than loop connections 105 and 107 on each longitudinal side thereof, it is adapted to act as a transverse fulcrum point as the weight of the animal is shifted to either side thereof. It is in point to mention at this time that the distribution of the weight of each platform 87 and 88, transversely, or fore and aft, of the loop connections thereof with walls 93 and 94, is such that the platforms are counterbalanced aft to assume, by gravity, a horizontal plane of disposition. Thus, as the animal instinctively proceeds toward the light opening 92, the platform 88 remains immobile and stable. When, however, the animal nears the light opening 92, the shift of the weight of the animal to the outboard portion of the platform 88, causes the platform to pivot clockwise, as viewed in Figures 14 and 15, about the midway loop connection 106 as a transverse axis. The effect of this is to raise hook 118 of inboard arm 117 out of locked engagement with slot 114, of wall 94, as shown in Figure 26. This leaves the platform 88 unlocked and free to rock clockwise, as viewed in Figure 19, from its full line to its dotted line position, and about loop connections 105, 106 and 107 as a longitudinal axis. The resulting movement of the platform is a compound rotation about both its transverse and longitudinal axis to slope toward the outboard portion of the tank. The resulting tilting action of the platform is thus delayed until the animal has proceeded too far to effect a retreat.

The runway, up to the sudden tilt, has not been shaky, but firm and immobile so as to give no indication of the danger ahead. This sudden and effective weight actuated tilt catches the animal completely unaware and off guard. As the sudden tilt occurs, the animal invariably slides into the liquid in the tank. Immediately as it slides off the platform, the counterbalanced platform resumes its normal horizontal position by gravity and is again locked there by hook 118, as shown in detail in Figures 24 and 25. Thus, once in the tank, there is no escape for the animal who inevitably drowns.

As stated before, it is a simple matter to remove the tank and discharge the water and drowned animals and to replace the tank with fresh water. This entails merely the manual pushing up of the handle 7 from its position of Figure 2 to that of Figure 23 to release its connection from the base 1 and unit 2.

Figure 6:
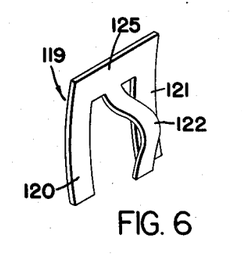
Figure 6 is a view in perspective of a locking clip employed for maintaining the operative parts of the mechanism in position while removing the water tank.
Figure 23:
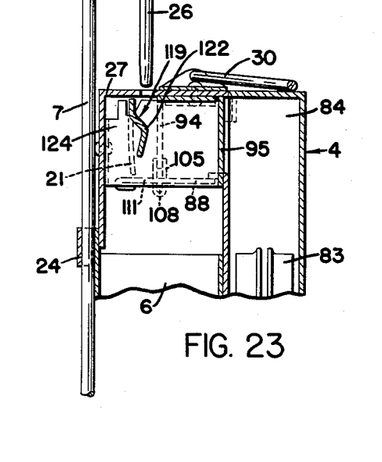
Figure 23 is a view similar to Figure 20, showing the locking lever in place to prevent tilting of the dumping platform.

As an added refinement, I prefer to provide means whereby the removal of the tank will not interfere with the locked adjustment of the dumping platforms 87 and 88 which are maintained locked by hooks, such as 118, on arms 116 and 117 on the platforms. This may be accomplished by a simple clip, such as generally shown in perspective detail in Figure 6 at 119, to include two side straight legs 120 and 121 and a bowed intermediate leg 122. As shown in Figures 15 and 23, the partition member 95 is a channel member with a closed front end and two rearwardly extending spaced walls 123 and 124, each of which has its upper edge provided with a notch to receive the horizontal arm 125 of clip 119 as its positioning bowed arm 122 extends between the spaced walls 123 and 124. This is to position the clip so that legs 120 and 121 bear downwardly on platforms 87 and 88 forwardly of their longitudinal pivotal axes, as defined by their loop connections to walls 93 and 94, so as to not disturb the locked engagement in normal horizontal position effected by hooks, such as 118 shown in Figures 24 and 25.

Figure 20:
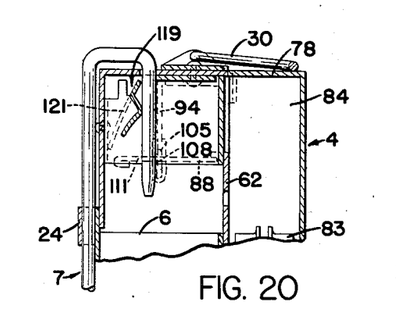
Figure 20 is a view in section taken along line 20—20 of Figures 14 and 15.
Figure 21:
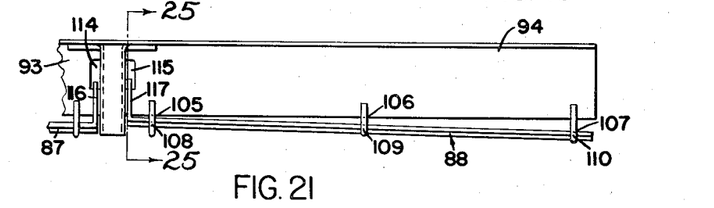
Figure 21 is a view in elevation of the dumping platform, similar to that shown in Figure 14, except showing the platform in its initial stage of tilting.
Figure 22:
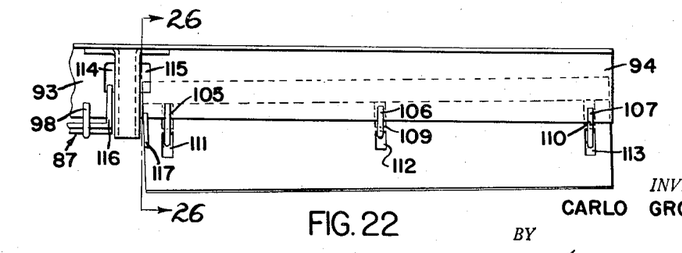
Figure 22 is a view similar to Figure 21, showing the dumping platform fully tilted.

It is to be understood that the safety clip 119 may remain in the trap at all times. When the hook 26 of the handle is in locked assembled position, as shown in Figure 20, it bears against the bowed portion 122 of the clip to swing the same clockwise to remove the straight legs 120 and 121 upwardly out of engagement with the upper surfaces of the inboard ends of the tiltable dumping platforms 87 and 88. It is when the hook 26 is removed from this position, as shown in Figure 23, for the purpose of removing the drowning tank 6, that the clip swings into the position shown in Figure 23, that the lower ends of legs 120 and 121 retain the platforms 87 and 88 in locked position by hook 118 against inadvertent displacement.

As a further refinement, I have found it advisable to provide runways 66 and 75 of Figures 27, 28 and 29, with integral vertical arms 126 and 127 near their transverse pivot points 67 and 76. As shown in Figure 27, these arms project upwardly through appropriate longitudinal slots in foldable arms 12 and 13 of the base and have convenient manually engageable lugs 128 and 129. This permits manual resetting of the trap by selectively moving door closures 43 and 44 or 45 and 46 into open positions, even while the duplex trap is in fully assembled position. The purpose of the holes 21 in the top wall 20, as viewed in Figure 16, is to see into the base portion and its operative mechanism, shown in Figures 7, 8 and 9, when the water tank has been removed, as the tank normally rests on the upper wall 20.

Thus, it will be seen that in carrying out the objects of my invention, I have provided a duplex animal trap for mass catching, in which the trapping, resetting and dumping platforms for dumping the animal into the tank, for each of the two units of the trap, are operable independently of the other, the drowning tank being the only part that is common to both of the two trapping units. I have further provided a duplex animal trap in which there is only one entrance for each of the two units and in which there is normally provided for each entrance opening, a clear vision for the animal of the bait tray and throughout the other entrance opening, to the exterior, which feature further enhances the attractiveness for the animal to enter the trap. I have further provided a new and novel means in each trapping unit for a quick closing of the entrance opening door behind the animal and the simultaneous closing of the door to prevent the animal from actually reaching the bait tray. In addition, I have provided a fool-proof means for preventing the animal from manually lifting the door behind it, should the door engage its body, or tail, and without amputating or binding the animal in such position, should this occur. I have also provided a new and novel trap resetting means that is automatically operated by the weight of the animal as it pursues other possible means of escape, while insuring against the possibility of the animal retreating. I have also provided means for luring the animal to climb the ladder while preventing its retreat, to a position adjacent the tiltable dumping platform. I have further provided a new and novel tiltable dumping platform that provides a stable and immobile runway for the animal until it has neared the end of the passage in which a light opening is provided, before sudden tilting of the dumping platform is effected, the purpose of which is to avoid the platform from being tilted, or being shaky in nature, upon initial entrance thereto, which might otherwise create a tendency upon the part of the animal to retreat and fail to emerge upon the platform to be dumped into the drowning tank. I have further provided a trap, including various units that are inexpensive to manufacture and which are so designed as to be readily assembled and disassembled with the maximum of ease.

Moreover, in the interests of sanitation, I have provided a trap in which the animal never reaches the bait tray. Consequently, the bait tray may be removed and serviced without touching any surface with which the animal has come into contact. The convenient arrangement of the drowning tank makes it easily possible to dump the contents, including the water and the drowned animals, and to be refilled with water and replaced in the assembled trap without physical contact with any surface with which the animal has come into contact.

Additionally, by means of the conveniently arranged lugs 128 and 129 on arms 126 and 127, arranged to protrude to the exterior, as shown in Figure 1, it is also possible to reset either unit of the duplex trap and to open the entrance doors and the doors to the bait tray whenever desired, as hereinabove described in detail, without handling any surface which the animal has contacted.

Moreover, the animal in no way becomes wounded or mutilated during the various stages of entrapment from his entrance into the trap to, and including, his drowning in the tank, nor can he retreat from any stage once having entered it. Thus, there is no warning to other animals that an animal has preceded it to its entrapment or destruction. It only could know that an animal has preceded it but not that any harm has befallen it.

I claim:

1. In an animal trap having a reservoir and adapted for mass catching of animals in successive stages of entrapment during the animal's travel within the trap from first being entrapped within the confines of the trap until and during its entrapment within said reservoir which forms no part of the operative mechanism, said trap including a housing provided with an animal entrance doorway, a bait tray arranged in said housing remote from said entrance doorway, a bait tray doorway leading to said bait tray from said entrance, said trap having a closure door for its animal entrance doorway and a closure door for said bait tray doorway, means rigidly connecting said closure doors together, an initial entrapment compartment in the base of said housing between the animal entrance doorway and the bait tray doorway, pivotal locking means in said compartment and in normal upper position engaging said rigid door connecting means for said entrance doorway and said bait tray doorway to normally lock the same in upper open positions against the force of gravity, a second animal entrapping compartment and an entrance for the animal from said first trapping compartment into said second animal entrapment compartment, said second compartment having automatic animal operated means for preventing retreat of said animal back into said first compartment, trap resetting means in said second entrapment compartment including pivoted means for unlocking and lifting of said closure doors upwardly against the force of gravity, after said animal has operated said retreat preventing means, and to lock said closure doors in an upper open position by said locking means in said initial trapping compartment, a dumping compartment, an upright ladder and a vertical ascension compartment therefor for said animal provided with gravity closing animal retreat preventing means and providing a passage for said animal between said second compartment and said dumping compartment, said dumping compartment being provided with a longitudinally pivoted dumping platform, below which is arranged in said housing said reservoir, said dumping platform being provided with longitudinally spaced pivotal connections to said housing and a locking member carried by the inboard end of said dumping platform adjacent the entrance thereto from said ladder, the dumping compartment having a slot normally receiving said locking member, the pivotal connections and locking member of said dumping platform and the slot of said dumping compartment at the inboard end of said dumping platform being so arranged as to normally maintain said dumping platform locked and transversely and longitudinally stable in a horizontal plane, and adapted to be unlocked only upon the weight of the animal being imposed upon the outboard end of said dumping platform, whereupon said dumping platform becomes pivoted about its transverse axis to unlock said locking member to permit said dumping platform to swing about its longitudinal axis, to dump said animal into said reservoir, said dumping platform being counterbalanced to be swung by gravity to return to its normal locked horizontal position upon removal of the animal's weight thereupon.

2. In an animal trap having a reservoir and adapted for mass catching of animals successively and in successive stages of entrapment during the animal's travel within the trap from first being entrapped within the confines of the trap until and during its entrapment within said reservoir which forms no part of the operative mechanism, said trap including a housing provided with an animal entrance doorway, a bait tray arranged in said housing remote from said entrance doorway, a bait tray doorway leading to said bait tray from said entrance, said trap having a closure door for its animal entrance doorway and a closure door for said bait tray doorway, means rigidly connecting said closure doors together, an initial entrapment compartment in the base of said housing between the animal entrance doorway and the bait tray doorway, pivotal locking means in said compartment and in normal upper position engaging said rigid door connecting means to normally lock the same in upper open positions against the force of gravity, cooperating means carried by said housing and said closure doors for locking both of said closure doors in any of a plurality of stages of closing of said closure doors against opening of same by manual pressure exerted upwardly thereon, a second animal entrapping compartment and an entrance for the animal from said first trapping compartment into said second animal entrapment compartment, said second compartment having automatic animal operated means for preventing retreat of said animal back into said first compartment, trap resetting means in said second entrapment compartment including pivoted means for unlocking and lifting of said closure doors upwardly against the force of gravity, after said animal has operated said retreat preventing means, and to lock said closure doors in an upper open position by said locking means carried by the pivotal means in said initial trapping compartment, a dumping compartment, an upright ladder and a vertical ascension compartment therefor for said animal provided with gravity closing animal retreat preventing means and providing a passage for said animal between said second compartment and said dumping compartment, said dumping compartment being provided with a horizontal longitudinally pivoted dumping platform, below which is arranged in said housing said reservoir.

3. In an animal trap having a reservoir and adapted for mass catching of animals successively and in successive stages of entrapment during the animal's travel within the trap from first being entrapped within the confines of the trap until and during its entrapment within said reservoir which forms no part of the operative mechanism, said trap including a housing provided with an animal entrance doorway, a bait tray arranged in said housing remote from said animal entrance, a bait tray doorway leading to said bait tray from said entrance, said trap having a closure door for its animal entrance doorway and a closure door for said bait tray doorway, means rigidly connecting said closure doors together, an initial entrapment compartment in the base of said housing between the animal entrance doorway and the bait tray doorway, pivotal locking means in said compartment and in normal upper position engaging said rigid door connecting means for said entrance doorway and said bait tray doorway to lock the same in upper open position against the force of gravity, cooperating means carried by said housing and said closure doors for locking both of said closure doors in any of a plurality of stages of closing of said closure doors against opening of same by manual pressure exerted upwardly thereon, a second animal entrapping compartment and an entrance for the animal from said first trapping compartment into said second animal entrapment compartment, said second compartment having automatic animal operated means for preventing retreat of said animal back into said first compartment, trap resetting means in said second entrapment compartment including pivoted means for unlocking and lifting of said closure doors upwardly against the force of gravity, after said animal has operated said retreat preventing means, and to lock said closure doors in an upper open position by said locking means carried by the pivoted means in said first trapping compartment, a dumping compartment, an upright ladder and a vertical ascension compartment therefor for said animal provided with gravity closing animal retreat preventing means and providing a passage for said animal between said second compartment and said dumping compartment, said dumping compartment being provided with a normally horizontal longitudinally pivoted dumping platform, below which is arranged in said housing said reservoir, said dumping platform being provided with longitudinally spaced pivotal connections to said housing and a locking member carried by the inboard end of said dumping platform, adjacent the entrance thereto from said ladder, the dumping compartment having a slot normally receiving said locking member, the pivotal connections and locking member of said dumping platform and the slot of said dumping compartment at the inboard end of said dumping platform being so arranged as to normally maintain said dumping platform locked and transversely and longitudinally stable in a horizontal plane, and adapted to be unlocked only upon the weight of the animal being imposed upon the outboard end of said dumping platform, whereupon said dumping platform becomes pivoted about its transverse axis to unlock said locking member to permit said dumping platform to swing about its longitudinal axis, to dump said animal into said reservoir, said dumping platform being counterbalanced to be swung by gravity to return to its normal locked horizontal position upon removal of the animal's weight thereupon.

4. In an animal trap having a receptacle and adapted for mass catching of animals successively and in successive stages of entrapment during the animal's travel within the trap from first being entrapped within the confines of the trap until and during its entrapment within said receptacle containing liquid for the purpose of drowning the animal, and which receptacle forms no part of the operative mechanism, said trap including a duplex arrangement of two separate and identical trapping units arranged in line within an elongated housing, a single animal entrance doorway at each of the opposite ends of said housing, one for each trapping unit, a bait tray removably arranged at the center of said housing midway between said entrance doorways, bait tray doorways arranged on each side of said bait tray to present a clear line of vision for the animal from outside one entrance doorway through the other, each of said trapping units having a closure door for its animal entrance doorway and said bait tray doorway, the closure doors of each unit being rigidly connected to each other by a bar element pivotally connected to said housing to swing upon a longitudinal pivotal axis, an initial entrapment compartment within said housing at the base thereof extending longitudinally between the animal entrance doorway and the bait tray doorway, a movable platform transversely pivoted to said base in said compartment, locking means carried by said platform and in normal upper position engaging said bar element to simultaneously lock said closure doors for said entrance doorway and said bait tray doorway in their upper open positions against the force of gravity, pawl and ratchet means carried by said housing and said closure doors for said entrance doorway for locking both of said closure doors in any of a plurality of stages of closing of said closure doors against opening of same by manual pressure exerted upwardly thereon, a second animal entrapping compartment and an entrance for the animal from said first trapping compartment into said second animal entrapment compartment, said second compartment having an automatic animal operated hinged flap for preventing retreat of said animal back into said first compartment, trap resetting means in said second entrapment compartment including a transversely pivoted runway and means carried thereby for unlocking said bar and lifting said closure doors for said entrance doorway and said bait tray doorway upwardly against the force of gravity, after said animal has operated said automatic hinged flap, and to lock said closure doors for said entrance doorway and said bait tray doorway in an upper open position by said locking means carried by the pivoted platform in said first trapping compartment in said base, a dumping compartment, an upright ladder and a vertical ascension compartment therefor for said animal provided with gravity closing hinged flaps to prevent retreat of said animal and leading to said dumping compartment, said dumping compartment being provided with a normally horizontal longitudinally pivoted dumping platform, below which is arranged in said housing the removable animal drowning receptacle to receive the animal dumped by said dumping platform.

5. In an animal trap having a reservoir and adapted for mass catching of animals successively and in successive stages of entrapment during the animal's travel within the trap from first being entrapped within the confines of the trap until and during its entrapment within said reservoir containing liquid for the purpose of drowning the animal, and which reservoir forms no part of the operative mechanism, said trap including a duplex arrangement of two separate and identical trapping units, arranged in line within an elongated housing, an animal entrance doorway at each of the opposite ends of said housing, one for each trapping unit, a bait tray arranged in said housing remote from said entrance doorway, a bait tray doorway leading to said bait tray from said entrance, each of said trapping units having a closure door for its animal entrance doorway and its bait tray doorway, an initial entrapment compartment within said housing at the base thereof extending longitudinally between the animal entrance doorway and the bait tray doorway, a movable platform transversely pivoted to said base in said compartment, the closure doors of each unit being rigidly connected to each other by a bar element pivotally connected to said housing to pivotally swing upon a longitudinal axis, locking means carried by said platform and in normal upper position engaging said bar element to simultaneously lock its closure doors in an upper open position against the force of gravity, pawl and ratchet means carried by said housing and said closure doors for locking said closure doors in any of a plurality of stages of closing of said closure doors against opening the same by manual pressure exerted upwardly thereon, a second animal entrapping compartment and an entrance for the animal from said first trapping compartment into said second animal entrapment compartment, said second compartment having an automatic animal operated hinged flap for preventing retreat of said animal back into said first compartment, trap resetting means in said second entrapment compartment including a transversely pivoted runway and means carried thereby for unlocking said bar element and lifting said closure doors upwardly against the force of gravity, after said animal has operated said automatic hinged flap, and to lock said closure doors in an upper open position by said locking means carried by the pivoted platform in said first trapping compartment in said base, a dumping compartment, an upright ladder and a vertical ascension compartment therefor for said animal provided with gravity closing hinged flaps to prevent retreat of said animal and leading to said dumping compartment, said dumping compartment being provided with a normally horizontal longitudinally pivoted dumping platform, below which is arranged in said housing the removable animal drowning reservoir to receive the animal dumped by said dumping platform, said dumping platform being provided with three longitudinally spaced pivotal connections to said housing, the middle one of which pivotal connections is so arranged as to be shorter than the inboard and outboard two end pivotal connections to also provide a horizontal transverse pivot for endwise pivoting of said dumping platform, a locking member carried by the inboard end of said dumping platform, adjacent the entrance thereto from said ladder, to normally maintain said dumping platform locked and transversely and longitudinally stable in a horizontal plane, and adapted to be unlocked only upon the weight of the animal being imposed upon the outboard portion of said dumping platform adjacent to the outboard end of said dumping compartment, whereupon said dumping platform becomes pivoted about its transverse axis, as defined by said midway pivotal connections, to unlock said locking means, and swing said dumping platform about its longitudinal axis, as defined by said three pivotal connections, to dump said animal into said reservoir, said dumping platform being counterbalanced to be swung by gravity to return to its normal locked horizontal position upon removal of the animal's weight thereupon.

6. In an animal trap, including a base, a reservoir and a housing, for mass catching of animals successively and in successive stages of entrapment during the animal's progress from first being entrapped within the confines of the trap unit and during its state of demise within said reservoir said reservoir being adapted to contain a liquid for animal drowning purposes and being removably attached to said housing, said trap including a duplex arrangement of two separate and identical trapping units arranged within an elongated housing, said housing having a single animal entrance opening providing a doorway at the opposite ends thereof, one for each trapping unit, a bait tray removably arranged in said base at the longitudinal center of said housing midway between said entrance openings and openings providing doorways on each side of said bait tray to present a clear line of vision from outside one entrance opening through the other, each of said trapping units having a closure door for its entrance opening and the opening to said bait tray, said closure doors for said entrance doorway and bait tray doorway being rigidly connected with each other and pivotally mounted upon a common longitudinal pivotal axis, an animal entrapment compartment within said housing at the base thereof extending longitudinally between the entrance opening and the opening to said bait tray, a second entrapping compartment and a closure door opening and resetting mechanism mounted therein for opening said entrance door and bait tray door, an entrance for the animal from said first trapping compartment into said second trap resetting compartment, a dumping compartment, an animal climbing ladder on said housing and a removable cover provided with hinged doors to prevent retreat of said animal and leading to said dumping compartment, said dumping compartment being provided with a longitudinal pivoted dumping platform below which is arranged in said housing said removable animal drowning reservoir, a handle for said reservoir and means carried by said housing and base for cooperating with said handle for locking said bait tray and reservoir in assembled position with said base and housing.

7. In an animal trap, including a base, a reservoir and a housing, for mass catching of animals successively and in successive stages of entrapment during the animals' progress from first being entrapped within the confines of the trap until and during its state of demise within said reservoir, said reservoir being adapted to contain a liquid for animal drowning purposes and being removably attached to said housing, said trap, including a duplex arrangement of two separate and identical trapping units arranged within an elongated housing, said housing having an animal entrance opening providing a doorway at the opposite ends thereof, one for each trapping unit, a bait tray removably arranged in said base at the longitudinal center of said housing midway between said entrance openings and openings providing doorways on each side of said bait tray to present a clear line of vision from outside one entrance opening through the other, each of said trapping units having a closure door for its entrance doorway and the doorway to said bait tray, said entrance and bait tray closures for each unit being rigidly connected with each other and each being pivotally mounted upon a common longitudinal pivotal axis, an initial animal entrapment compartment within said housing at the base thereof extending between said entrance doorway and said bait tray doorway, a second entrapping compartment, a resetting mechanism mounted therein for opening the entrance door and bait tray door simultaneously together, an entrance for the animal from said first trapping compartment into said second trap resetting compartment, a dumping compartment for each unit, an animal climbing ladder and a removable cover therefor provided with doors to prevent retreat of said animal and leading to said dumping compartment, said dumping compartment being provided with a longitudinal pivoted dumping platform below which is arranged in said housing the removable animal drowning tank, said dumping platform being provided with three longitudinally spaced pivotal connections to said housing, the middle one of which is so arranged as to also provide a transverse pivot for endwise movement of said dumping platform, a locking member carried by the inboard end of said dumping platform, the dumping compartment having a slot normally receiving said locking member, the pivotal connections and locking member of said dumping platform and the slot of said dumping compartment at the inboard end of said dumping platform being so arranged as to normally maintain said dumping platform transversely and longitudinally stable in a horizontal plane and adapted to be unlocked only upon the weight of the animal being imposed upon the outboard portion of said dumping platform adjacent to the outboard end of said dumping compartment whereupon said dumping platform becomes pivoted about its transverse axis to unlock said locking means about its longitudinal axis to dump said animal into said tank, said dumping platform being counterbalanced to return to its normal locked horizontal position upon removal of the animal therefrom, a clip positioned to bear downwardly on the adjacent inboard ends of said dumping platform, a removable locking handle for said removable reservoir to hold said reservoir and bait tray locked and to engage said clip out of engagement with said dumping platforms and when removed leaving said clip free to swing to lock said dumping platform against movement.

8. In an animal trap, including a liquid reservoir for drowning said animal, a base and a housing, for trapping animals in successive stages of entrapment during the animals' progress from first being entrapped within the confines of the trap housing until and during its state of demise within said reservoir, said trap including an animal entrance doorway in said housing, a bait tray removably arranged within said housing, means in said housing providing a bait tray doorway, said trapping unit having a normally open closure door for its entrance doorway and a normally open closure door for said bait tray doorway, said closure doors being rigid with each other and pivotally mounted upon a common longitudinal pivotal axis, an animal entrapment compartment in said housing between said entrance doorway and said bait tray doorway, a passageway from said compartment leading to a dumping compartment, a dumping compartment, animal operated means in said entrapment compartment for permitting said closure doors to move to closed position, a longitudinally pivoted dumping platform in said dumping compartment, below which is arranged in said housing said animal drowning reservoir, said dumping platform being provided with three longitudinally spaced pivotal connections to said housing, the middle one of which is so arranged as to also provide a transverse pivot for endwise movement of said dumping platform, a locking member carried by the inboard end of said dumping platform to normally maintain said dumping platform transversely and longitudinally stable in a horizontal plane and adapted to be unlocked only upon the weight of the animal being imposed upon the outboard portion of said dumping platform beyond said middle pivotal connection adjacent to the outboard end of said dumping compartment whereupon said dumping platform becomes pivoted about its transverse axis to unlock said locking means and about its longitudinal axis to dump said animal into said tank, said dumping platform being counterbalanced to return to its normal locked horizontal position upon removal of the animal therefrom.

References Cited in the file of this patent

UNITED STATES PATENTS

| Number | Name | Date |
|---|---|---|
| 60,143 | Clarke | Dec. 4, 1866 |
| 760,738 | Huguley | May 24, 1904 |
| 910,532 | Harrington | Jan. 26, 1909 |
| 1,400,175 | McCurrie | Dec. 13, 1921 |
| 1,730,963 | Atwell et al. | Oct. 8, 1929 |
| 1,741,429 | Orgill | Dec. 31, 1929 |
| 2,205,970 | Burnley | June 25, 1940 |
| 2,484,452 | Grossi | Oct. 11, 1949 |
| 2,549,080 | Grossi | Apr. 17, 1951 |
| 2,599,711 | Hembree | June 10, 1952 |
| 2,632,279 | Gumfory | Mar. 24, 1953 |